United States Patent
Busch et al.

(10) Patent No.: US 12,198,064 B2
(45) Date of Patent: Jan. 14, 2025

(54) SYSTEMS AND METHODS FOR DETERMINING CIRCUIT-LEVEL EFFECTS ON CLASSIFIER ACCURACY

(71) Applicant: Syntiant, Irvine, CA (US)

(72) Inventors: Kurt F. Busch, Laguna Hills, CA (US); Jeremiah H. Holleman, III, Irvine, CA (US); Pieter Vorenkamp, Laguna Beach, CA (US); Stephen W. Bailey, Irvine, CA (US)

(73) Assignee: SYNTIANT, Irvine, CA (US)

( * ) Notice: Subject to any disclaimer, the term of this patent is extended or adjusted under 35 U.S.C. 154(b) by 0 days.

(21) Appl. No.: 16/109,646

(22) Filed: Aug. 22, 2018

(65) Prior Publication Data
US 2019/0065962 A1    Feb. 28, 2019

Related U.S. Application Data

(60) Provisional application No. 62/548,892, filed on Aug. 22, 2017.

(51) Int. Cl.
*G06N 3/10* (2006.01)
*G06N 3/04* (2023.01)
(Continued)

(52) U.S. Cl.
CPC .............. *G06N 3/10* (2013.01); *G06N 3/04* (2013.01); *G06N 3/065* (2023.01); *G06N 3/08* (2013.01); *G06N 3/105* (2013.01)

(58) Field of Classification Search
CPC .. G06N 3/02; G06N 3/04; G06N 3/08; G06N 3/10; G06N 3/049; G06N 3/0454; G06N 3/0635; G06N 3/065; G06N 3/105
See application file for complete search history.

(56) References Cited

U.S. PATENT DOCUMENTS 9,104,973 B2 * 8/2015 Izhikevich ............. G06N 3/063
9,189,730 B1 * 11/2015 Coenen .................. G06N 3/049
(Continued)

OTHER PUBLICATIONS

Abdelbaki et al. "Analog hardware implementation of the random neural network model." Proceedings of the IEEE-INNS-ENNS International Joint Conference on Neural Networks. IJCNN 2000. Neural Computing: New Challenges and Perspectives for the New Millennium. vol. 4. IEEE, 2000, pp. 197-201 (Year: 2000).*
(Continued)

*Primary Examiner* — Randall K. Baldwin
(74) *Attorney, Agent, or Firm* — Rutan & Tucker, LLP; Hani Z. Sayed; Ravi Mohan

(57) ABSTRACT

A computerized method comprising receiving, by a simulator logic, inputs including: (i) at least one circuit-level characteristic, and (ii) an architectural description of a neural network, modeling, by the simulator logic, execution of the neural network described in the inputs to obtain results representative of what an analog implementation of the neural network would produce, and determining, by the simulator logic, an accuracy of computational analog elements within the analog implementation of the neural network based on the results obtained during modeling of the neural network is described. In some embodiments, the circuit-level characteristic includes thermal or flicker noise, an inaccuracy of weights between nodes within the neural network, or a frequency response variations of an integrated circuit. Additionally, the circuit-level characteristic can be obtained through simulation of an integrated circuit based on technology-specific measurements of the integrated circuit.

18 Claims, 4 Drawing Sheets

(51) Int. Cl.
  *G06N 3/065* (2023.01)
  *G06N 3/08* (2023.01)

(56) References Cited

U.S. PATENT DOCUMENTS

| | | | |
|---|---|---|---|
| 2011/0004579 A1 | 1/2011 | Snider | |
| 2011/0119214 A1* | 5/2011 | Breitwisch | G06N 3/0635 706/33 |
| 2013/0073495 A1* | 3/2013 | Izhikevich | G06N 3/063 706/25 |
| 2013/0325776 A1* | 12/2013 | Ponulak | G06N 20/00 700/250 |
| 2014/0081895 A1* | 3/2014 | Coenen | G06N 3/049 706/25 |
| 2015/0106310 A1* | 4/2015 | Birdwell | G06N 3/086 706/20 |
| 2015/0106316 A1 | 4/2015 | Birdwell et al. | |
| 2015/0269481 A1 | 9/2015 | Annapureddy et al. | |
| 2015/0269483 A1 | 9/2015 | Nishitani et al. | |
| 2015/0286766 A1* | 10/2015 | Singh | G06F 17/5072 716/121 |
| 2016/0155050 A1* | 6/2016 | Buibas | G06N 3/049 706/11 |
| 2016/0224887 A1* | 8/2016 | Friedman | G06N 3/049 |
| 2017/0039456 A1* | 2/2017 | Saberian | G06N 3/08 |
| 2017/0213126 A1* | 7/2017 | Hammond | G06F 8/31 |
| 2018/0007382 A1* | 1/2018 | Pio | H04N 19/52 |
| 2018/0253642 A1* | 9/2018 | Gokmen | G06N 3/084 |
| 2018/0293517 A1* | 10/2018 | Browne | G06Q 10/00 |

OTHER PUBLICATIONS

Kabisatpathy, Prithviraj, A. Barua, and S. Sinha. "A pseudo-random testing scheme for analog integrated circuits using artificial neural network model-based observers." The 2002 45th Midwest Symposium on Circuits and Systems, 2002. MWSCAS-2002 . . . vol. 2. IEEE, 2002, pp. 465-468 (Year: 2002).*

Alpaydin et al. "An evolutionary approach to automatic synthesis of high-performance analog integrated circuits." IEEE Transactions on Evolutionary Computation 7.3 (2003): pp. 240-252. (Year: 2003).*

Renaud et al. "Neuromimetic ICs with analog cores: an alternative for simulating spiking neural networks." 2007 IEEE international symposium on circuits and systems. IEEE, 2007, pp. 3355-3358 (Year: 2007).*

Harahap et al. "Layout Design and Simulation for Analog Neural Network Circuit Using CMOS Technology 0, 35 µM." ARPN Journal of Engineering and Applied Science, vol. 9, No. 10, Oct. 2014, pp. 1783-1788 (Year: 2014).*

Hasani et al. "Efficient modeling of complex analog integrated circuits using neural networks." 2016 12th Conference on Ph. D. Research in Microelectronics and Electronics (Prime). IEEE, 2016. (Year: 2016).*

Du et al. "An Analog Neural Network Computing Engine using CMOS-Compatible Charge-Trap-Transistor (CTT)." arXiv preprint arXiv:1709.06614, 2017, pp. 1-11. (Year: 2017).*

Simsek, et al. "Study of the Effects of Nonidealities in Multilayer Analog Neural Networks with Circuit Level Simulation." Proceedings of 8th Mediterranean Electrotechnical Conference on Industrial Applications in Power Systems, Computer Science and Telecommunications (MELECON 96) vol. 2. IEEE:613-616 (Year: 1996).*

Bayraktarolu, İsmet, Sina Balkr, and Günhan Dündar. "ANNSiS: A circuit level simulator for analog neural networks." (1996). ( Year: 1996).*

Carmona, Ricardo, et al. "Sirena: a CAD environment for behavioural modelling and simulation of VLSI cellular neural network chips." International journal of circuit theory and applications 27.1 (1999): 43-76. (Year: 1999).*

Chung et al. "Insight: A neuromorphic computing system for evaluation of large neural networks." arXiv preprint arXiv: 1508.01008 (2015). (Year: 2015).*

Xia et al. "MNSIM: Simulation platform for memristor-based neuromorphic computing system." IEEE Transactions on Computer-Aided Design of Integrated Circuits and Systems 37.5 (Jul. 2017): 1009-1022. (Year: 2017).*

Ahmed, Mohammed Riyaz, and B. K. Sujatha. "Reinforcement Learning based on Computational Cognitive Neuroscience in Neuromorphic VLSI Chips." International Journal 3.8 (2013): 1144-1149. (Year: 2013).*

Bahubalindruni, Pydi Ganga, et al. "Transparent current mirrors with a-GIZO TFTs: Neural modeling, simulation and fabrication." Journal of Display Technology 9.12 (2013): 1001-1006. (Year: 2013).*

Parvat, Aniruddha, et al. "A survey of deep-learning frameworks." 2017 International Conference on Inventive Systems and Control (ICISC). IEEE, Jan. 2017. (Year: 2017).*

Ramasubramanian, Shankar Ganesh, et al. "Spindle: SPINtronic deep learning engine for large-scale neuromorphic computing." 2014 IEEE/ACM International Symposium on Low Power Electronics and Design (Islped). IEEE, 2014: 15-20. (Year: 2014).*

Binas, Jonathan, et al. "Precise deep neural network computation on imprecise low-power analog hardware." arXiv: Computer Science/ Neural and Evolutionary Computing 1606.1606.07786 (2016): 1-21. (Year: 2016).*

Maliuk, Dzmitry, and Yiorgos Makris. "An experimentation platform for on-chip integration of analog neural networks: A pathway to trusted and robust analog/RF ICs." IEEE transactions on neural networks and learning systems 26.8 (2014): 1721-1734. (Year: 2014).*

International Search Report, PCT Application No. PCT/US18/047610, dated Jan. 15, 2019.

* cited by examiner

SYSTEMS AND METHODS FOR DETERMINING CIRCUIT-LEVEL EFFECTS ON CLASSIFIER ACCURACY

PRIORITY

This application claims the benefit of priority to U.S. Provisional Patent Application No. 62/548,892, filed Aug. 22, 2017, titled "SYSTEMS AND METHODS FOR DETERMINING CIRCUIT EFFECT ON CLASSIFIERS," which is hereby incorporated by reference into this application in its entirety.

FIELD

Embodiments of the disclosure related to the field of neuromorphic computing. More specifically, embodiments of the disclosure relate to systems and methods for modeling effects of non-ideal circuit-level characteristics on a neural network, particularly those configured as classifiers.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips can be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which can include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence ("AI") algorithms. To accomplish this, neuromorphic chips can contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

Disclosed herein are systems and methods for modeling effects of circuit-level characteristics on neural networks, particularly those configured as classifiers. Such systems and methods are useful in saving time and money with respect to designing and maintaining neuromorphic integrated circuits in which the neural networks are implemented.

SUMMARY

Disclosed herein is a computerized method including, in some embodiments, receiving a number of inputs by a simulator logic, wherein the inputs include (i) one or more circuit-level characteristics and (ii) an architectural description of a neural network; simulating in one or more simulations by the simulator logic execution of the neural network described in the inputs to obtain results representative of that of an analog implementation of the neural network would produce; and determining through the one or more simulations an effect of the one or more circuit-level characteristics on a performance of the neural network.

In some embodiments, the computerized method further includes determining with the simulator logic an accuracy of analog computational elements within the analog implementation of the neural network based on the results obtained during the one or more simulations of the neural network.

In some embodiments, results obtained during the one or more simulations of the neural network are used to determine specifications required of the analog circuits.

In some embodiments, the one or more circuit-level characteristics include at least thermal noise or flicker noise.

In some embodiments, the one or more circuit-level characteristics include at least an inaccuracy of weights between nodes within the neural network.

In some embodiments, the one or more circuit-level characteristics include at least a frequency response variation of a simulated integrated circuit.

In some embodiments, the one or more circuit-level characteristics are obtained through simulation of a simulated integrated circuit based on technology-specific measurements of the simulated integrated circuit.

In some embodiments, the architectural description of the neural network includes an output of a neural network development platform.

In some embodiments, the neural network development platform includes one of TensorFlow, DistBelief, Keras, MXNet, Torch, or Caffe.

Disclosed herein is a method including, in some embodiments, receiving a number of inputs by a simulator logic, wherein the inputs include (i) one or more circuit-level characteristics and (ii) an architectural description of a neural network; simulating in one or more simulations by the simulator logic execution of the neural network described in the inputs to obtain results representative of that of an analog implementation of the neural network would produce; determining through the one or more simulations an effect of the one or more circuit-level characteristics on a performance of the neural network; and manufacturing a neuromorphic integrated circuit including the analog implementation of the neural network, wherein the neural network of the neuromorphic integrated circuit has an optimized performance in accordance with the one or more simulations.

In some embodiments, the method further includes determining through the one or more simulations classification accuracy of the neural network.

In some embodiments, the method further includes developing and providing through a remote service one or more firmware updates for the neuromorphic integrated circuit in accordance with one or more additional simulations.

In some embodiments, the one or more circuit-level characteristics are selected from thermal noise, flicker noise, an inaccuracy of weights between nodes within the neural network, and frequency response variations of a simulated integrated circuit.

In some embodiments, the one or more circuit-level characteristics include thermal noise or flicker noise.

In some embodiments, the one or more circuit-level characteristics include an inaccuracy of weights between nodes within the neural network.

In some embodiments, the one or more circuit-level characteristics include frequency response variations of the simulated integrated circuit.

Disclosed herein is a method including, in some embodiments, receiving a number of inputs by a simulator logic, wherein the inputs include (i) one or more circuit-level characteristics and (ii) an architectural description of a neural network; simulating in one or more simulations by the simulator logic execution of the neural network described in the inputs to obtain results representative of that of an analog implementation of the neural network would produce; determining through the one or more simulations an effect of the one or more circuit-level characteristics on a performance of the neural network as well as classification accuracy of the neural network, wherein the one or more circuit-level characteristics are selected from thermal noise, flicker noise, an inaccuracy of weights between nodes within the neural network, and frequency response variations of a simulated integrated circuit; and manufacturing a neuromorphic integrated circuit including the analog implementation of the neural network, wherein the neural network of the neuromorphic integrated circuit has an optimized performance in accordance with the one or more simulations.

In some embodiments, the one or more circuit-level characteristics are obtained through the one or more simulations of the simulated integrated circuit based on technology-specific measurements of the simulated integrated circuit.

In some embodiments, the neuromorphic integrated circuit includes a number of two-quadrant multipliers in an analog multiplier array configured for filtering or communications decoding such as interpreting low-density parity-check ("LDPC") codes, wherein each of the two-quadrant multipliers is configured for two-quadrant multiplication of a signed weight and a non-negative input current value.

In some embodiments, the method further includes developing and providing through a remote service one or more firmware updates for the neuromorphic integrated circuit in accordance with one or more additional simulations.

In some embodiments, the architectural description of the neural network includes an output of a neural network development platform selected from TensorFlow, DistBelief, Keras, MXNet, Torch, and Caffe.

DRAWINGS

Embodiments of this disclosure are illustrated by way of example and not by way of limitation in the figures of the accompanying drawings, in which like references indicate similar elements and in which.

Figure 5:
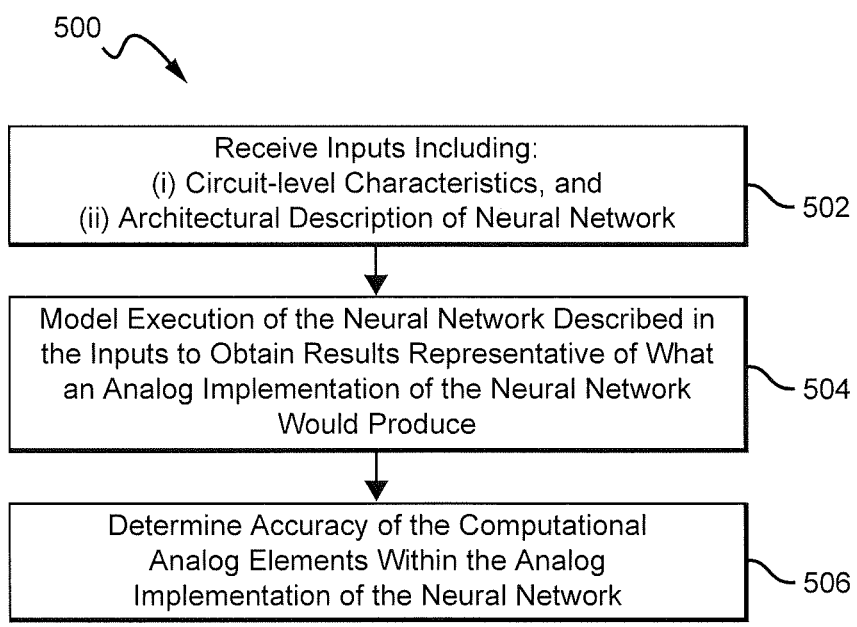

FIG. 5 provides a flowchart illustrating operations of modeling effects of non-ideal circuit-level characteristics on a neural network in accordance with some embodiments.

DESCRIPTION

Provided herein is a method including, in some embodiments, reprogramming values within a flash/multiplier analog array in response to detecting an error with values stored within the analog array. Specifically, responsive to the expiration of a timer, a signal is transmitted to circuitry causing the circuitry to retrieve (i) values stored in an analog array, and (ii) values stored in a digital non-volatile memory. Subsequently, the circuitry performs a comparison of the values retrieved from the analog array and the values retrieved from the digital non-volatile memory. The circuitry then analyzes the results of the comparison to determine whether an error greater than or equal to a predefined threshold exists (e.g., whether the values stored in the analog array have suffered from voltage drift or current leakage). Responsive to determining an error above the predefined threshold exists, the circuitry initiates operations to reprogram the analog array with the values stored in the digital non-volatile memory.

In some embodiments, the timer is configured to expire at periodic intervals.

In some embodiments, the error includes a difference between one or more of the values retrieved from the analog array and the corresponding values stored in the digital non-volatile memory. In such embodiments, the threshold includes a predefined percentage.

In some embodiments, the error includes a number of values retrieved from the analog array outside of the corresponding ranges stored in the digital non-volatile memory. In such embodiments, the threshold includes a predefined number of values or a predefined percentage of the values.

Terminology

In the following description, certain terminology is used to describe features of the invention. For example, in certain situations, the term "logic" can be representative of hardware, firmware and/or software that is configured to perform one or more functions. As hardware, logic can include circuitry having data processing or storage functionality. Examples of such circuitry can include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" can include an instance of a computer program (e.g., a collection of instructions, also referred to herein as an application). In one embodiment, the process can be included of one or more threads executing concurrently (e.g., each thread can be executing the same or a different instruction concurrently).

The term "processing" can include executing a binary or script or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed.

The term "file" is used in a broad sense to refer to a set or collection of data, information or other content used with a computer program. A file may be accessed, opened, stored, manipulated or otherwise processed as a single entity, object or unit. A file may contain other files and may contain related or unrelated contents or no contents at all. A file may also have a logical format or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Disclosed herein are systems and methods for modeling effects of circuit-level characteristics on neural networks, particularly those configured as classifiers. Such systems and methods are useful in saving time and money with respect to designing and maintaining neuromorphic integrated circuits in which the neural networks are implemented. Aspects of the neuromorphic integrated circuits and the neural networks thereof will be described before other aspects of modeling the effects of circuit-level characteristics on the neural networks are described.

Figure 1:
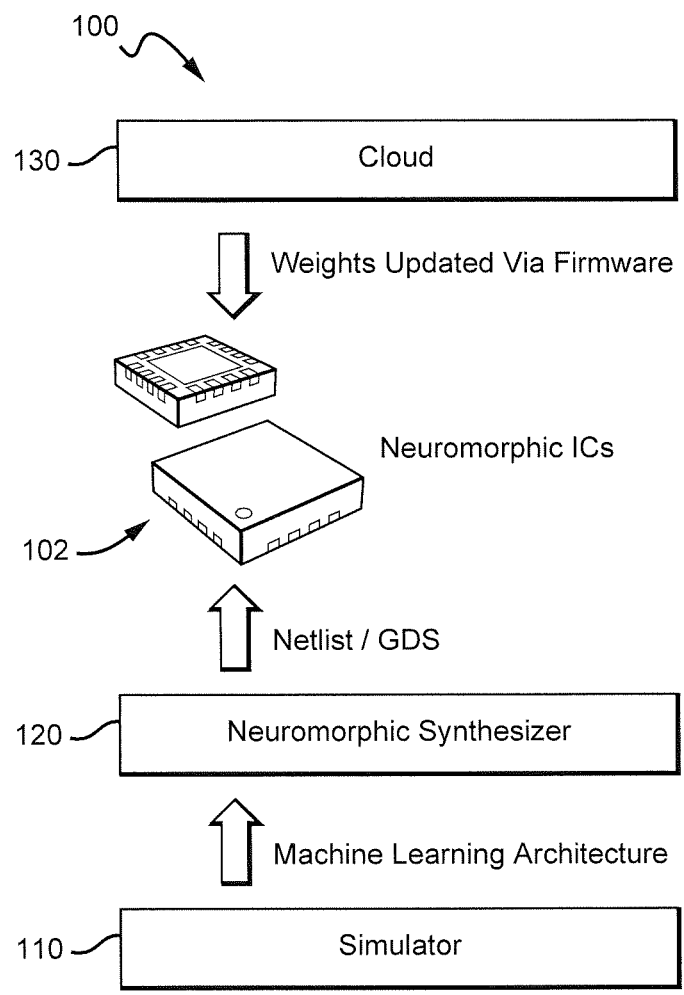
FIG. 1 illustrates a system 100 for designing and updating neuromorphic integrated circuits ("ICs") in accordance with some embodiments.

Referring now to FIG. 1, FIG. 1 illustrates a system 100 for designing and updating neuromorphic ICs is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the neural nodes, the initial firmware can be updated as needed by the cloud 130 to adjust the weights.

Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSP") including, but not limited to, keyword spotting, voice recognition, one or more audio filters, gesture recognition, image recognition, video object classification and segmentation, or autonomous vehicles including drones. For example, if the particular problem is one of image recognition (e.g., recognizing an image of a cat or a dog and classifying it as such), the simulator 110 can create a machine learning architecture with respect to one or more aspects of image recognition. The neuromorphic synthesizer 120 can subsequently transform the machine learning architecture into a netlist and a GDS file corresponding to a neuromorphic IC for image recognition, which can be fabricated in accordance with current IC fabrication technology. Once the neuromorphic IC for image recognition is fabricated, it can be deployed to work on image recognition in a system or device in need of image recognition.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet of things ("IoT") devices, or hearing devices or systems.

Figure 2:
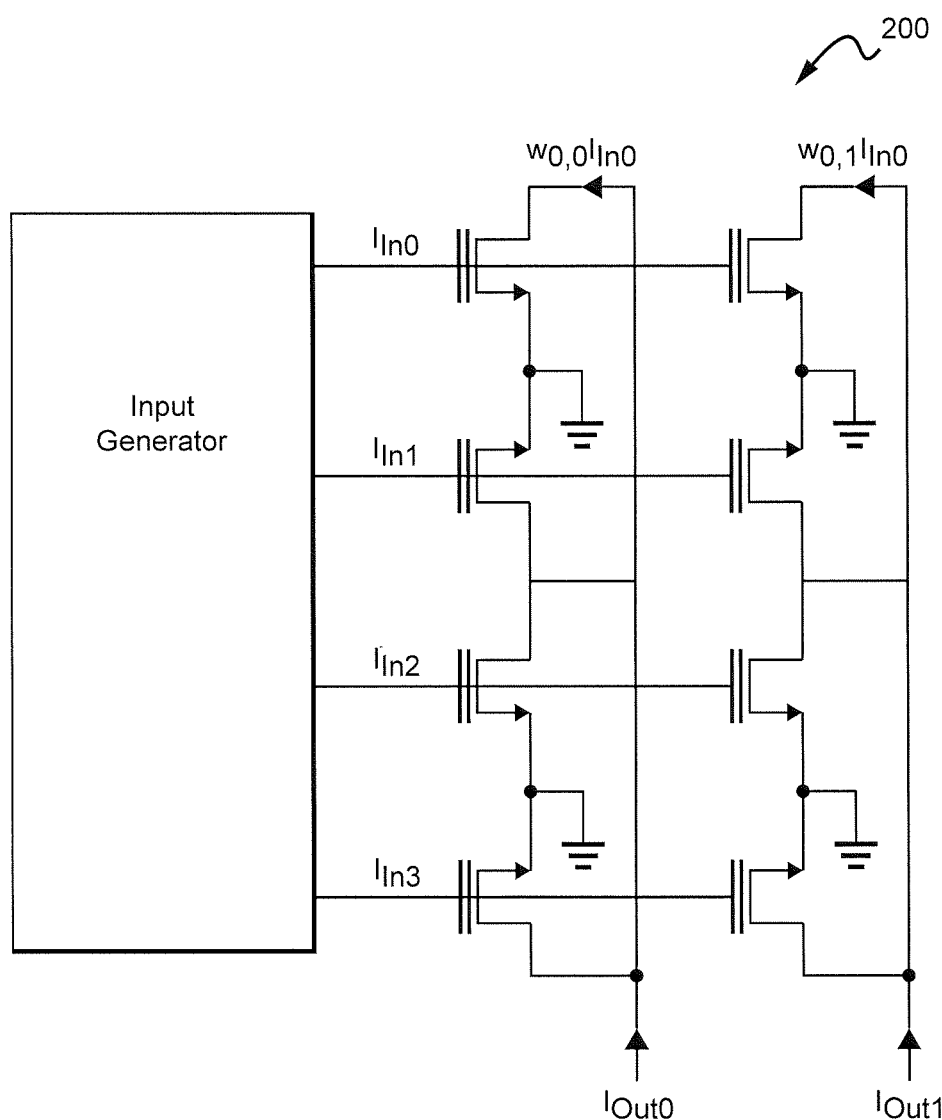
FIG. 2 illustrates an analog multiplier array in accordance with some embodiments.

Referring now to FIG. 2, FIG. 2 illustrates an analog multiplier array 200 is provided in accordance with some embodiments. Such an analog multiplier array can be based on a digital NOR flash array in that a core of the analog multiplier array can be similar to a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC. However, the neural network is not limited to the foregoing. The neural network can further include a digital layer in addition to analog layers of the neural network disposed in the analog multiplier array 200.

Since the analog multiplier array 200 is an analog circuit, input and output currents can vary in a continuous range instead of simply on or off. This is useful for storing weights (aka coefficients) of the neural network as opposed to digital bits. In operation, the weights are multiplied by input currents to provide output currents that are combined to arrive at a decision of the neural network.

The analog multiplier array 200 can utilize standard programming and erase circuitry to generate tunneling and erase voltages.

Figure 3:
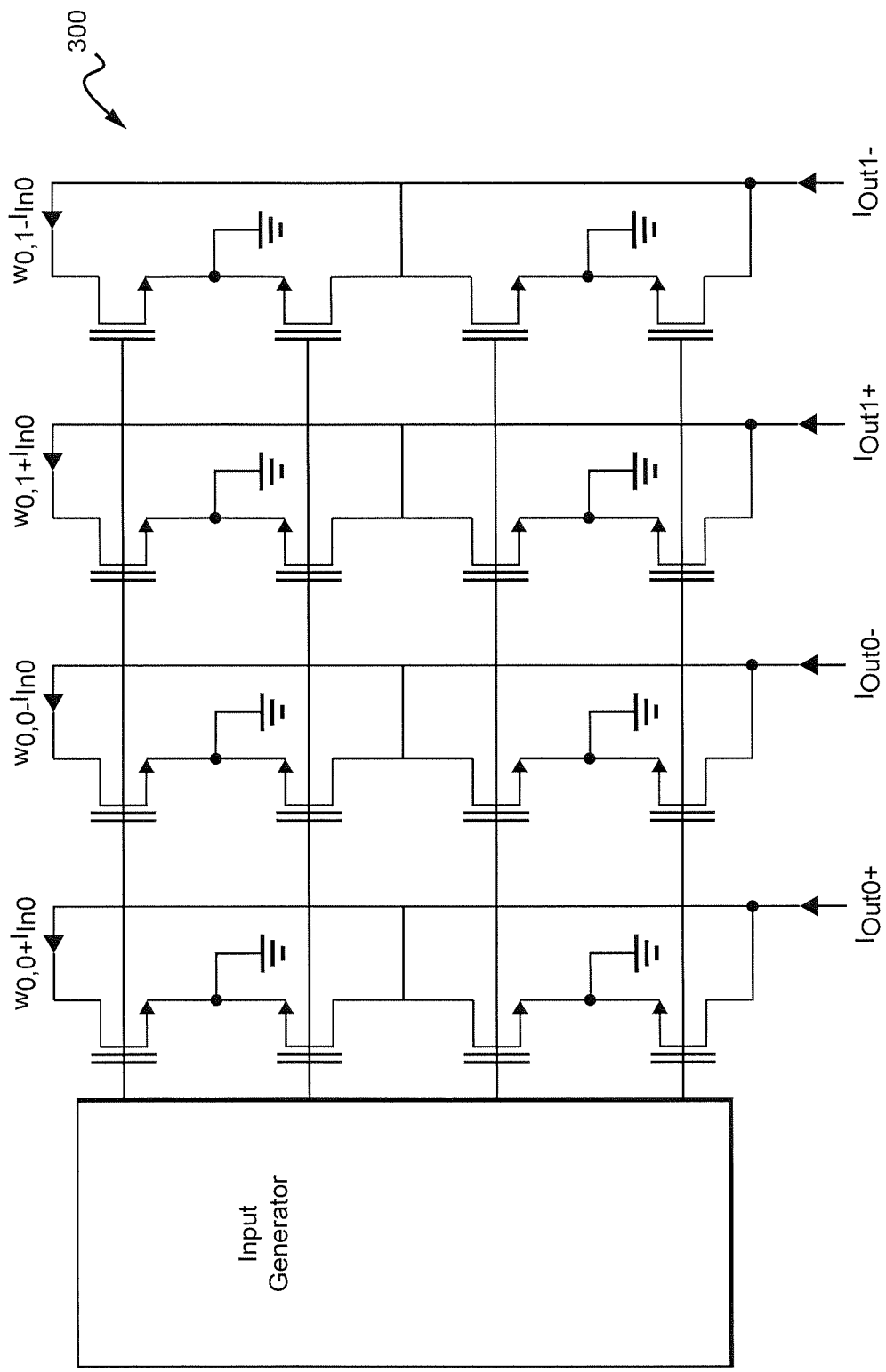
FIG. 3 illustrates an analog multiplier array in accordance with some embodiments.

Referring now to FIG. 3, FIG. 3 illustrates an analog multiplier array 300 is provided in accordance with some embodiments. The analog multiplier array 300 can use two transistors (e.g., a positive metal-oxide-semiconductor field-effect transistor ["MOSFET"] and a negative MOSFET) to perform a two-quadrant multiplication of a signed weight (e.g., a positive weight or a negative weight) and a non-negative input current value. If an input current value is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). The foregoing positively and negatively weighted products or output signals can be taken as a differential current value to provide useful information for making a decision (e.g., recognizing an image of a cat or a dog and classifying it as such).

Because each output current from the positive or negative transistor is wired to ground and proportional to the product of the input current value and the positive or negative weight, respectively, the power consumption of the positive or negative transistor is near zero when the input currents or weights are at or near zero. That is, if the input signals are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current) regardless of the input signal.

Figure 4:
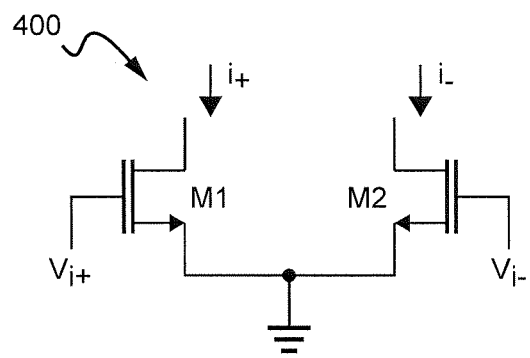
FIG. 4 illustrates a bias-free, two-quadrant multiplier of an analog multiplier array in accordance with some embodiments.

Referring now to FIG. 4, illustrates a bias-free two-quadrant multiplier 400 of an analog multiplier array such as the analog multiplier array 300 is provided in accordance with some embodiments. Because each output current from the positive (e.g., M1 of the two-quadrant multiplier 400) or negative transistor is (e.g., M2 of the two-quadrant multiplier 400) is wired to ground and proportional to the product of the input current value and the positive or negative weight, respectively, the power consumption of the positive or negative transistor is at or near zero when the input currents or weights are at or near zero. That is, if the input signals are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current $I_B$) regardless of the input signal.

When programming a two-quadrant multiplier such as the bias-free, two-quadrant multiplier 400, it is common to erase each programmable cell (e.g., the cell including transistor M1 and the cell including transistor M2) thereof to set the cells to one extreme weight value before setting each of the cells to its target weight value. Extending this to a full array such as the analog multiplier array 300, all of the programmable cells in the full array are set to one extreme weight value before setting each of the cells to its target weight value. When setting the cells to their desired weight values, a problem of overshoot exists if one or more of the cells is set with a higher weight value than targeted: That is, all of the cells in the full array must be reset to the one extreme weight value before resetting the cells to their target weight values. However, the differential structure of each of the bias-free, two-quadrant multipliers of the analog multiplier arrays provided herein allows for compensating such overshoot by programming, thereby obviating the time-consuming process of erasing and resetting all of the cells in an array.

In an example of compensating for overshoot by programming, $V_{i-}$ and $V_{i+}$ of the two-quadrant multiplier 400 can be erased to set the cells to one extreme weight value. After erasing the cells, if $V_{i-}$ is programmed with too large a weight value, $V_{i+}$ can be programmed with a larger weight value than initially targeted to compensate for the weight value of $V_{i-}$ and achieve the initially targeted effect. Therefore, the differential structure can be exploited to compensate for programming overshoot without having to erase any one or more cells and start over.

Referring now to FIG. 5, FIG. 5 provides a flowchart illustrating operations of modeling effects of non-ideal circuit-level characteristics on a neural network by a simulator logic is provided in accordance with some embodiments. Each block illustrated in FIG. 5 represents an operation performed in the method 500 of modeling effects of non-ideal circuit-level characteristics on a neural network by the simulator logic. Specifically, through performance of the method 500, the simulator logic determines the classification accuracy and/or the regression function of the neural network for which an architectural description is received.

The method 500 begins when the simulator logic receives inputs including: (i) circuit-level characteristics, and (ii) an architectural description of a neural network (block 502). In some embodiments, examples of circuit-level characteristics can include, but are not limited or restricted to, noise (e.g., thermal and/or flicker), inaccuracy of weights between nodes within the neural network, non-linearity of the integrated circuit on which the neural network is processed, frequency response variations of an IC (e.g., amplitude and center-frequency errors) that can occur in feature extraction with respect to acoustic signals and/or time-domain signals. The circuit-level characteristics can be obtained through circuit (e.g., IC) simulation based on technology-specific measurements at the foundry. In some embodiments, the term "architectural description of a neural network" can refer to the output of a neural network development platform, such as TensorFlow, DistBelief, Keras, MXNet, Torch, Caffe or the like.

At block 504, the simulator logic models the execution of the neural network described in the input to obtain results representative of what an analog implementation of the neural network would produce. Computational operators (e.g., multiplication, addition, sigmoid, etc.) that are expected to be used in the modeling process can be represented by an existing function or class in the neural network framework library (e.g., TensorFlow, Caffe, or the like). When an operator is not represented in the neural network framework library, software modules are developed to represent those operators. For example, when the function "operation_1( )" is used in the description of the neural network provided to the simulator and such a function is not included in the neural network framework library, an extension to the neural network framework library is written. Additional extensions to the neural network framework library will be written based on the existing functions (including the newly written extension) but can include modifications that account for the error sources or other circuit-level characteristics. Continuing the example above, the extension "operation_1( )" can be used as a base in writing an additional extension for the neural network framework library that accounts for error sources or circuit-level characteristics.

The following function continues the example and illustrates an exemplary "operation_1( )":

```
function y=operation_1(x)

return x*x
```

When a time-varying noise source added to the output is to be modeled, a new function can be written:

```
function y'=operation_1_syn(x)

parameter rms_noise_level return x*x+rms_noise_level*gaussian_rand( )
```

The time-varying noise source can be represented by the parameter "rms_noise_level." The original neural network can then be modified to point to the modified function (function y') instead of the original function (function y), by methods including direct modification of the original source code or the utilization of standard object-oriented software methods to change the behavior of the original source code, which would avoid a need to modify the original source code representing the neural network. By processing the neural network with the modified functions, modeling of the neural network is performed while taking into account error sources and other circuit-level characteristics of an IC.

At block 506, the simulator logic determines the accuracy of the computational analog elements within the analog implementation of the neural network. As one non-limiting example, output of the simulator could be provided information indicating that a noise level of 200 µVrms added to the output of the multipliers in layer one of the neural network reduces the classification accuracy from 98.5% to 97%. In some embodiments, the simulator logic and accompanying method 500 can be used to design a reconfigurable integrated circuit.

In the foregoing description, the invention is described with reference to specific exemplary embodiments thereof. It will, however, be evident that various modifications and changes can be made thereto without departing from the broader spirit and scope of the invention as set forth in the appended claims.

What is claimed is:

1. A computerized method comprising:
    receiving a plurality of inputs by a simulator logic, the inputs including
    (i) one or more non-ideal circuit-level characteristics based on technology-specific measurements taken at a foundry, and
    (ii) an architectural description of a neural network;
    the one or more non-ideal circuit-level characteristics comprising non-linearity of an integrated circuit on which the neural network is processed;
    simulating, in one or more software-based simulations performed by the simulator logic, execution of the neural network described in the inputs to obtain results of the one or more simulations, the results being representative of that of an analog implementation of the neural network would produce, wherein the simulating includes modifying a function of the neural network for purposes of simulation to account for a first non-ideal circuit-level characteristic;
    in response to a determination that a function is not represented in a framework library associated with the neural network, developing a software module to represent the function;
    writing a new extension to the neural network framework library;
    writing one or more additional extensions to the neural network framework library based on existing functions including the newly written extension, and comprising one or more modifications that account for an error source or one of the one or more non-ideal circuit-level characteristics;
    determining an effect of the one or more non-ideal circuit-level characteristics on a performance of the neural network based on the results of the one or more simulations; and
    determining through the one or more simulations a classification accuracy of the neural network.

2. The computerized method of claim 1, further comprising: determining with the simulator logic an accuracy of analog computational elements within the analog implementation of the neural network based on the results of the one or more simulations obtained during the one or more simulations of the neural network.

3. The computerized method of claim 1, wherein the results of the one or more simulations obtained during the one or more simulations of the neural network are used to determine specifications required of one or more analog circuits.

4. The computerized method of claim 1, wherein the one or more non-ideal circuit-level characteristics include at least thermal noise or flicker noise.

5. The computerized method of claim 1, wherein the one or more non-ideal circuit-level characteristics include at least an inaccuracy of weights between nodes within the neural network.

6. The computerized method of claim 1, wherein the one or more non-ideal circuit-level characteristics include at least a frequency response variation of a simulated integrated circuit.

7. The computerized method of claim 1, wherein the architectural description of the neural network includes an output of a neural network development platform selected from TensorFlow, DistBelief, Keras, MXNet, Torch, and Caffe.

8. A method comprising:
    receiving a plurality of inputs by a simulator logic, the inputs including;
    (i) one or more non-ideal circuit-level characteristics based on technology-specific measurements taken at a foundry, and
    (ii) an architectural description of a neural network;
    the one or more non-ideal circuit-level characteristics comprising non-linearity of an integrated circuit on which the neural network is processed;
    simulating, in one or more software-based simulations performed by the simulator logic, execution of the neural network described in the inputs to obtain results of the one or more simulations, the results being representative of that of an analog implementation of the neural network would produce, wherein the simulating including modifying a function of the neural network for purposes of simulation to account for a first non-ideal circuit-level characteristic;
    in response to a determination that a function is not represented in a framework library associated with the neural network, developing a software module to represent the function;
    determining an effect of the one or more non-ideal circuit-level characteristics on a performance of the neural network based on the results of the one or more simulations;

determining through the one or more simulations a classification accuracy of the neural network;
writing a new extension to the neural network framework library;
writing one or more additional extensions to the neural network framework library based on an existing function and comprising one or more modifications that account for an error source or one of the one or more non-ideal circuit-level characteristics; and
manufacturing a neuromorphic integrated circuit including the analog implementation of the neural network.

9. The method of claim 8, further comprising:
developing and providing through a remote service one or more firmware updates for the neuromorphic integrated circuit in accordance with one or more additional simulations.

10. The method of claim 8, wherein the one or more non-ideal circuit-level characteristics are selected from thermal noise, flicker noise, an inaccuracy of weights between nodes within the neural network, and frequency response variations of a simulated integrated circuit.

11. The method of claim 10, wherein the one or more non-ideal circuit-level characteristics include thermal noise or flicker noise.

12. The method of claim 10, wherein the one or more non-ideal circuit-level characteristics include an inaccuracy of weights between nodes within the neural network.

13. The method of claim 10, wherein the non-ideal one or more circuit-level characteristics include frequency response variations of the simulated integrated circuit.

14. A method comprising:
receiving a plurality of inputs by a simulator logic, the inputs including
(i) one or more non-ideal circuit-level characteristics based on technology-specific measurements taken at a foundry, and
(ii) an architectural description of a neural network;
the one or more non-ideal circuit-level characteristics comprising non-linearity of an integrated circuit on which the neural network is processed, and at least one of thermal noise, flicker noise, an inaccuracy of weights between nodes within the neural network, and frequency response variations of a simulated integrated circuit;
simulating, in one or more software-based simulations performed by the simulator logic, execution of the neural network described in the inputs to obtain results of the one or more simulations, the results being representative of that of an analog implementation of the neural network would produce, wherein the simulating includes modifying a function of the neural network for purposes of simulation to account for a first non-ideal circuit-level characteristic;
in response to a determination that a function is not represented in a framework library associated with the neural network, developing a software module to represent the function;
writing a new extension to the neural network framework library;
writing one or more additional extensions to the neural network framework library based on one or more existing functions and comprising one or more modifications that take into account an error or one of the one or more non-ideal circuit-level characteristics;
determining an effect of the one or more non-ideal circuit-level characteristics on a performance of the neural network as well as classification accuracy of the neural network based on the results of the one or more simulations; and
manufacturing a hardware-based neuromorphic integrated circuit including the analog implementation of the neural network.

15. The method of claim 14, wherein the one or more non-ideal circuit-level characteristics are obtained through the one or more simulations of the simulated integrated circuit based on technology-specific measurements of the simulated integrated circuit.

16. The method of claim 14, wherein the neuromorphic integrated circuit includes a number of two-quadrant multipliers in an analog multiplier array configured for filtering or communications decoding, wherein each of the two-quadrant multipliers is configured for two-quadrant multiplication of a signed weight and a non-negative input current value.

17. The method of claim 16, further comprising:
developing and providing through a remote service one or more firmware updates for the neuromorphic integrated circuit in accordance with one or more additional simulations.

18. The method of claim 14, wherein the architectural description of the neural network includes an output of a neural network development platform selected from TensorFlow, DistBelief, Kerns, MXNet, Torch, and Caffe.

* * * * *